(12) United States Patent
Chen et al.

(10) Patent No.: US 8,437,221 B2
(45) Date of Patent: May 7, 2013

(54) TERMINAL AND METHOD AND SYSTEM FOR AUTOMATICALLY CONTROLLING TERMINAL

(75) Inventors: Cheng Chen, Beijing (CN); Ming Wu, Beijing (CN); Gang Wei, Beijing (CN)

(73) Assignees: Legend Holdings Ltd., Beijing (CN); Lenovo (Beijing) Limited, Beijing (CN)

( * ) Notice: Subject to any disclaimer, the term of this patent is extended or adjusted under 35 U.S.C. 154(b) by 886 days.

(21) Appl. No.: 12/228,818

(22) Filed: Aug. 15, 2008

(65) Prior Publication Data

US 2009/0046537 A1 Feb. 19, 2009

(30) Foreign Application Priority Data

Aug. 16, 2007 (CN) .......................... 2007 1 0120367

(51) Int. Cl.
*G01S 15/08* (2006.01)
*G11B 21/02* (2006.01)

(52) U.S. Cl.
USPC .................................. 367/98; 367/99; 360/75

(58) Field of Classification Search .................... 367/96, 367/98, 99; 360/57, 75
See application file for complete search history.

(56) References Cited

U.S. PATENT DOCUMENTS

| | | | |
|---|---|---|---|
| 5,227,929 A * | 7/1993 | Comerford | 360/75 |
| 6,421,064 B1 | 7/2002 | Lemelson et al. | |
| 7,351,925 B2 * | 4/2008 | Wehrenberg | 200/61.45 R |
| 7,450,332 B2 * | 11/2008 | Pasolini et al. | 360/75 |
| 7,525,751 B2 * | 4/2009 | Han et al. | 360/75 |
| 7,541,551 B2 * | 6/2009 | Wehrenberg | 200/61.45 R |
| 7,644,222 B2 * | 1/2010 | Jeansonne et al. | 710/315 |
| 2002/0063477 A1 | 5/2002 | Chang et al. | |
| 2003/0051179 A1 | 3/2003 | Tsirkel et al. | |
| 2004/0019810 A1 | 1/2004 | Casebolt et al. | |
| 2004/0142705 A1 | 7/2004 | Casebolt et al. | |
| 2007/0241896 A1 | 10/2007 | Matsuoka et al. | |

FOREIGN PATENT DOCUMENTS

| | | |
|---|---|---|
| CN | 2741837 Y | 11/2005 |
| EP | 0810512 A1 | 3/1997 |
| JP | 8324366 A | 12/1996 |
| JP | 2006155770 A | 6/2006 |
| JP | 2006163515 A | 6/2006 |
| JP | 2007080214 A | 3/2007 |
| JP | 2007188604 A | 7/2007 |
| KR | 20010089021 A | 9/2001 |
| WO | 8301689 A1 | 5/1983 |

* cited by examiner

*Primary Examiner* — Ian Lobo
(74) *Attorney, Agent, or Firm* — Kinney & Lange, P.A.

(57) ABSTRACT

A system and method of automatically controlling a terminal are disclosed. In one aspect, there is a method comprising: installing a sensing device in a terminal; and automatically controlling operations of the terminal when a certain object is detected by the sensing device within a predetermined range. According to certain aspects, a hard disk may be subjected to a full protection, power supplied to peripherals such as a keyboard or a mouse is saved. Furthermore, in other aspects, an automatic power-up/down operation to the terminal, automatic forward and backward operations of a browser and an automatic page-flipping operation of application software may be implemented. In another aspect, there is a control system for the terminal and the terminal equipped with such a control system.

12 Claims, 5 Drawing Sheets

TERMINAL AND METHOD AND SYSTEM FOR AUTOMATICALLY CONTROLLING TERMINAL

BACKGROUND OF THE INVENTION

1. Field of Invention

The present invention relates to terminals, particularly to a method and a system for automatically controlling a terminal, and a terminal equipped with such a system.

2. Description of Prior Technology

An Active Protection System (APS) is a common technique for a hard disk protection, which is proposed to address a situation that a notebook computer is prone to drop to cause damage of the hard disk and data loss. This system may take an action in advance in response to a sudden movement such as a speedup, and shut down an input and read head of the hard disk in the notebook computer, until the notebook computer becomes stable, which is similar to a safety air-bag in a car to cushion an impingement. Therefore, this function is also called as a "safety air-bag" technique for the notebook computer.

In particular, the APS hard disk protection technique consists of an acceleration sensing chip embedded in a main board and a vibration prediction management software pre-installed in the system. It is determined whether a magnetic head of the hard disk is taken back to a magnetic head stop area from its working state or not, i.e. a hanging up operation is performed to the hard disk, by monitoring an angle, vibration and impingement of the notebook computer (i.e. monitoring a variation of a horizontal and a vertical accelerations), so that a damage to the hard disk by the impingement may be reduced to protect the hard disk and data therein. The vibration prediction management software receives respective signals from the acceleration sensing chip, and determines, according to its analysis, which signals are harmful to the hard disk and which are regular movements. The vibration prediction management software may ignore the regular movements which could not damage the hard disk. For the movements which tend to damage the hard disk, the vibration prediction management software may transmit information to the hard disk immediately, so as to take the magnetic head back to the stop area.

Although APS is able to protect the hard disk when the notebook computer drops, it could not provide a full protection to the hard disk. For example, when some peripheral object impinges the computer, current APS system does not work.

SUMMARY OF CERTAIN INVENTIVE ASPECTS

Accordingly, certain embodiments provide a method to address a problem that a hard disk could not be protected in the prior art when an external impingement occurs. One embodiment may also save the power supplied to a keyboard or a mouse, and implement an automatic power-up/down operation. Furthermore, certain embodiments may provide a control system and a terminal equipped with such a system.

One inventive aspect is a method of automatically controlling a terminal, which may comprise installing a sensing device in the terminal; and automatically controlling operations of a part of the terminal when a certain object is detected by the sensing device within a predetermined range.

A first application of the above method is that the sensing device is an ultrasonic transceiver. An implementation of the method may comprise the acts of initiating the ultrasonic transceiver to transmit ultrasonic wave, and receiving ultrasonic wave generated by the transmitted ultrasonic wave reflecting back from an object encountered; calculating a distance between the object and the terminal by using a wave speed and a time interval between the received and transmitted ultrasonic waves, and also calculating a speed of the object moving to the terminal; determining whether the distance and the speed reach thresholds predetermined by a system or not; and if yes, hanging up the hard disk.

The act of determining whether the distance and the speed reach thresholds predetermined by the system or not may comprise the acts of: determining whether the distance between the object and the terminal is equal to or less than a predetermined distance threshold; if yes, further determining whether the speed of the object reaches a predetermined speed threshold or not; and if yes, determining that the distance and the speed have reached the threshold predetermined by the system.

The act of determining whether the distance and the speed reach thresholds predetermined by the system or not may comprises the acts of: determining whether the speed of the object reaches the predetermined speed threshold or not; if yes, further determining whether the distance between the object and the terminal is equal to or less than the predetermined distance threshold; and if yes, determining that the distance and the speed have reached the threshold predetermined by the system.

The act of calculating the speed of the object may comprise recording a first frequency for the transmitted ultrasonic wave and a second frequency for the reflected ultrasonic wave, wherein the first frequency and the second frequency satisfy a Doppler relationship; and calculating the speed of the object with an expression of the Doppler relationship in acoustics.

The act of calculating the speed of the object may comprise initiating a process of transmitting the ultrasonic wave and receiving the reflected ultrasonic wave for several times, and calculating a difference of the time intervals between the reflection and the transmission in twice of the processes, and a difference of the distances between the twice of the processes; and calculating the speed of the object according to the difference of the distances and the difference of the time intervals.

After the hard disk is hung up, the method may further comprise an act of restarting the hard disk when the distance is larger than the distance threshold, or the speed of the object moving to the hard disk within the distance threshold is less than the speed threshold.

A quality and/or shape of the object is identified by an ultrasonic generator. Before determining whether a hanging up operation is performed to the hard disk or not, the speed and the quality and/or shape of the object are synthetically taken into account.

A second application of the above method is that the sensing device is an ultrasonic transceiver or an infrared sensor. The implementation of the method may comprise the acts of: determining whether the ultrasonic transceiver or the infrared sensor detects a hand of a user within the predetermined range or not; if yes, supplying power to a peripheral device of the terminal; otherwise, breaking the power-supply to the peripheral device of the terminal.

The peripheral device may include a mouse or a keyboard.

A third application of the above method is that the sensing device is an ultrasonic transceiver or an infrared sensor. The implementation of the method may comprise the acts of: determining whether the ultrasonic transceiver or the infrared sensor detects a hand of a user within the predetermined range or not; if yes, further determining a movement track of the hand, and then performing an operation corresponding to the movement track of the hand.

The operation corresponding to the movement track of the hand may include power-up and power-down operations to the terminal, forward and backward operations of a browser and a page-flipping operation of application software.

Furthermore, certain embodiments also provide a control system for a terminal.

The terminal may comprise an execution device for a particular part of the terminal and a sensing device. The system may comprise: an interface unit for receiving parameters detected by the sensing device and for sending a command to the execution device; a distance calculation unit for calculating a distance between an object detected by the sensing device and the terminal, according to the parameters provided by the interface unit; a threshold unit for storing a distance threshold; and a decision unit for deciding whether the distance is less than or equal to the distance threshold, in order to send out an execution command.

The part may be a hard disk. The execution device may be a hard disk control device. The sensing device may be an ultrasonic transceiver. The system may further comprise: a timing unit for obtaining parameters from the interface unit, and calculating a time interval between the times for receiving and transmitting ultrasonic waves; a distance calculation unit for calculating a distance between the object and the terminal by using a wave speed and the time interval provided by the timing unit; a speed calculation unit for calculating a speed of the object; the interface unit for receiving parameters for the ultrasonic waves transmitted or received by the ultrasonic transceiver, and for sending a hanging-up command to the hard disk control device; the threshold unit for storing the distance threshold and a speed threshold; the decision unit for deciding whether the distance is less than or equal to the distance threshold and deciding the speed of the object is larger than or equal to the speed threshold, in order to send out the hanging-up command.

The system may further comprise: a frequency recording unit for obtaining a first frequency for the transmitted ultrasonic wave from the interface unit and a second frequency for the reflected ultrasonic wave; and the speed calculation unit for calculating the speed by the first frequency and the second frequency which satisfy a Doppler relationship.

The speed calculation unit obtains, from the timing unit, a difference of the time intervals between transmission of the ultrasonic wave and reception of the reflected ultrasonic wave twice; obtains, from the distance calculation unit, the distances between the twice of the processes; and calculates the speed of the object according to the difference of the distances and the difference of the time intervals.

The decision unit is further used for determining whether the speed is less than the speed threshold or not. If yes, a hanging-up cancellation command is sent out, and the interface unit is further used for sending the hanging-up cancellation command to the hard disk control device.

The interface unit is further used for receiving information on a quality and/or shape of the object identified by the ultrasonic wave. The control unit may further comprise an analysis unit for analyzing parameters of the quality and/or shape of the object; the decision unit for sending out a hanging-up command based on the decision on the speed of the object as well as the analysis result of the quality and/or shape of the object.

The part may be a mouse or a keyboard. The execution apparatus may be a power-supply control unit of the mouse or the keyboard. The sensing unit is an ultrasonic transceiver or an infrared sensor. The decision unit sends out a power-supply command to the power-supply control unit of the mouse or the keyboard, when it determines that a distance between a hand of a user which is detected by the ultrasonic transceiver or the infrared sensor and the mouse or the keyboard is less than or equal to the distance threshold; otherwise, the power-supply control unit of the mouse or the keyboard sends out a power-supply forbidden command.

The part may be a power switch of the terminal, a browser, or application software. The sensing unit is an ultrasonic transceiver or an infrared sensor. The decision unit further determines a movement track of a hand of a user when it determines that a distance between the hand which is detected by the ultrasonic transceiver or the infrared sensor and the mouse or the keyboard is less than or equal to the distance threshold; and sends an execution command corresponding to the movement track of the hand to the execution apparatus.

Finally, one embodiment may be a terminal, comprising execution means for a particular part of the terminal, a sensing device and a control system. The system may comprise: an interface unit for receiving parameters detected by the sensing device and for sending a command to the execution device; a distance calculation unit for calculating a distance between an object detected by the sensing device and the terminal, according to the parameters provided by the interface unit; a threshold unit for storing a distance threshold; and a decision unit for deciding whether the distance is less than or equal to the distance threshold, in order to send out an execution command.

The part may be a hard disk. The execution device may be a hard disk control device. The sensing device is an ultrasonic transceiver. The system may further comprise: a timing unit for obtaining parameters from the interface unit, and calculating a time interval between the times for receiving and transmitting ultrasonic waves for each time; a distance calculation unit for calculating a distance between the object and the terminal by using a wave speed and the time interval provided by the timing unit; a speed calculation unit for calculating a speed of the object; the interface unit for receiving parameters for the ultrasonic waves transmitted or received by the ultrasonic transceiver, and for sending a hanging-up command to the hard disk control device; the threshold unit for storing the distance threshold and a speed threshold; and the decision unit for deciding whether the distance is less than or equal to the distance threshold and deciding the speed of the object is larger than or equal to the speed threshold, in order to send out the hanging-up command.

The part may be a mouse or a keyboard. The sensing unit may be an ultrasonic transceiver or an infrared sensor. The decision unit sends out a power-supply command to the power-supply control unit of the mouse or the keyboard, when it determines that a distance between a hand of a user which is detected by the ultrasonic transceiver or the infrared sensor and the mouse or the keyboard is less than or equal to the distance threshold; otherwise, the power-supply control unit of the mouse or the keyboard sends out a power-supply forbidden command.

The part may be a power switch of the terminal, a browser, or application software. The sensing unit is an ultrasonic transceiver or an infrared sensor. The decision unit further determines a movement track of a hand of a user when it determines that a distance between the hand which is detected by the ultrasonic transceiver or the infrared sensor and the mouse or the keyboard is less than or equal to the distance threshold; and sends an execution command corresponding to the movement track of the hand to the execution apparatus.

The technical effects of certain embodiments can be as follows:

(1) The current APS system may only protect the hard disk when the notebook computer itself falls down. While, the current APS system could not protect the hard disk effectively when some external object impinges the notebook computer. However, an ultrasonic wave technique is utilized in certain embodiments, which may monitor a speed of the object to the notebook computer within a certain distance. When a secure threshold is exceeded, the hard disk is hung up. Thus, the disadvantage of the current APS system may be avoided effectively.

(2) The combination of some embodiments and the current APS system may fully protect the security of the hard disk, the hard disk itself and the security of the user data.

(3) According to an embodiment, the keyboard or the mouse may be turned on, only if the hand of the user is sensed within the certain distance. Power may be saved.

(4) According to another embodiment, an automatic power-up/down operation to the terminal, automatic forward and backward operations of a browser and an automatic page-flipping operation of application software such as PPT may be implemented. It is more convenient and quick in use.

DETAILED DESCRIPTION OF CERTAIN INVENTIVE EMBODIMENTS

Figure 1:
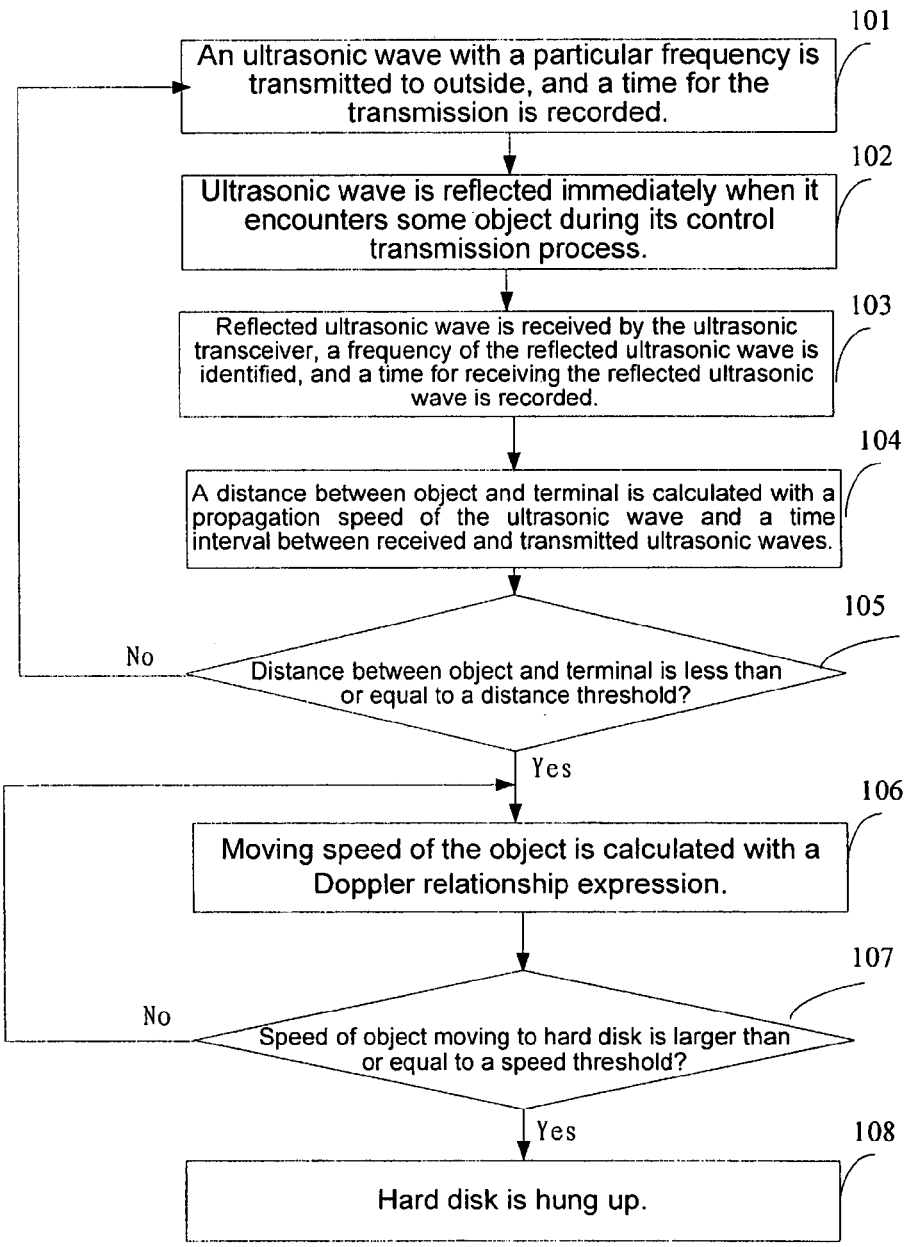
FIG. 1 is a flowchart of a first embodiment of a hard disk protection method according to an embodiment.

As explained above, the current APS system may only protect the hard disk when the notebook computer itself falls down. While, the current APS system could not protect the hard disk effectively in a case where some external object impinges the terminal. Therefore, certain embodiments address the problem that the external object impinges the terminal so as to cause the hard disk to be damaged. The present invention is not limited to the notebook computer, but is possible to be applied to various terminals such as a PDA device, a desktop computer etc., since the various terminals may be impinged by the external object.

Generally, the some embodiments may be implemented by installing an ultrasonic transceiver in the terminal; calculating a distance between the object and the terminal by using a wave speed and a time interval between the times for receiving and transmitting ultrasonic waves, and also calculating a speed of the object moving to the terminal; determining whether the distance and the speed reach thresholds predetermined by a system or not; and if yes, hanging up the hard disk. For example, when it is detected that there is an object, within a distance of 2 m to the terminal, is moving to the terminal at a speed of v which is higher than $v_0$, the hard disk is hung up, wherein v is the speed of the object, and $v_0$ is a speed threshold.

Furthermore, the method of installing the ultrasonic transceiver or other sensing devices in the terminal for implementing the automatic control to the terminal may also be applied to a keyboard or a mouse. When a hand of a user may be sensed within a certain distance, the keyboard or the mouse is turned on. Otherwise, the keyboard or the mouse is turned off. Therefore, the problem of power consumption for keeping the keyboard or the mouse working on when no one uses the keyboard or the mouse is avoided. Moreover, such a method may also be applied to power on or down the terminal. For example, when the sensing device senses a specified shape of the hand within the certain distance, the terminal is automatically powered on or down.

Therefore, the method according to certain embodiments may comprise:

1) installing a sensing device, such as the above ultrasonic transceiver or a Infrared sensor, etc., in the terminal;

2) automatically controlling operations of a particular part of the terminal when a certain object is detected by the sensing device within a certain range.

The controlled parts are different for different applications. For example, for the hard disk protection method, turning on/off a hard disk control device which is for hanging up the hard disk would be controlled; for the power saving method of the keyboard or the mouse, turning on/off a switch of the keyboard or the mouse would be controlled; and for the method of powering up or down the terminal, forward or backward of the browser, page-flipping of application software such as PPT, the power switch of the terminal, the browser and the application software would be controlled respectively.

Hereinafter, the above three applications of the method according to certain embodiments are illustrated respectively in connection with the figures.

Firstly, a first embodiment of a hard disk protection method is explained.

Referring to FIG. 1, it is a flowchart of the first embodiment of the hard disk according to an embodiment.

In block 101, an ultrasonic wave with a specified first frequency $f_1$ is transmitted to the outside by an ultrasonic transceiver in the terminal, and a time $t_1$ for the transmission is recorded, wherein the "outside" herein may be respective directions outside of the terminal. For example, the ultrasonic wave is transmitted to a position over the terminal.

In block 102, the ultrasonic wave is immediately reflected when a certain object is encountered during a control transmission process.

In block 103, the ultrasonic transceiver receives the reflected ultrasonic wave, identifies its frequency as a second frequency $f_2$, and records a time $t_2$ at which the reflected ultrasonic wave is received.

In block 104, a distance s between the object and the terminal is calculated with a propagation speed of the ultrasonic wave and a time interval between the times for receiving and transmitting ultrasonic waves.

Since the propagation speed of the ultrasonic wave in the air is 340 m/s, it may be calculated as:

$$s = 340 \times (t_2 - t_1)/2$$

In block 105, it is determined whether the distance s between the object and the terminal is less than or equal to a distance threshold $s_0$ or not. If less or equal, the process goes to the block 106; if not, the process returns back to the block 101.

In block 106, the speed v of the object moving to the hard disk is calculated with a Doppler relationship expression.

According to the acoustics Doppler effect, when a consecutive ultrasonic waves with frequency $f_1$ are transmitted to the moving object, a Doppler relationship is satisfied between $f_1$ and frequency $f_2$ of the ultrasonic wave reflected by the moving object. If an angle between a transmission direction of the ultrasonic wave and a moving direction of the moving object is known, and the ultrasonic transceiver may obtain the angle between the transmission direction of the ultrasonic wave and the moving direction of the moving object. Then the speed of the object may be calculated based on the Doppler relationship expression.

When a sound source is still, i.e. the terminal itself is not moving, the Doppler formula is as follows:

$$f_2=(c-v)f_1/c \tag{1}$$

Wherein, $f_1$ is a frequency for the transmitted ultrasonic wave, c is a speed for the transmitted ultrasonic wave, and $f_2$ is a frequency for the received ultrasonic wave, which are all known. Therefore, the speed v of the object may be calculated.

However, some terminal such as a notebook computer may move itself, thus a relative speed of the object relative to the terminal itself should be calculated.

Provided that the terminal (sound source) and the object move at the speeds of $v_s$ and v respectively simultaneously, a speed for the terminal transmitting the ultrasonic wave is c. Both of the $v_s$ and v are less than c since the sound speed is greatly high. The transmission frequency of the ultrasonic wave is $f_1$ and its wavelength is L, then the frequency of the ultrasonic wave received by the object is as follows:

$$f_2=(c-v)v/(c-v_s)L=(c-v)f_1/(c-v_s) \tag{2}$$

When $v_s=0$, i.e. the terminal itself is not moving, the above formula (1) is derived.

According to formula (23), the speed v of the object may be derived when the terminal itself is moving.

In block 107, it is determined whether the speed v of the object moving to the hard disk is larger than or equal to a speed threshold $v_0$ or not. If larger or equal, the process goes to the block 108; if not, the process returns back to the block 106.

In block 108, the hard disk is hung up.

Additionally, when no object is detected to be moving within a range of $s_0$, or, the speed of the object moving to the hard disk within the range of $s_0$ is less than $v_0$, the hanging up of the hard disk may be cancelled, and the hard disk is resumed to operate.

Next, a second embodiment of a hard disk protection method is explained.

This embodiment calculates the speed of the object in another way other than the first embodiment. Generally speaking, the speed is calculated by transmitting and receiving the ultrasonic waves for multiple times and utilizing a distance difference and a time interval difference between two of the processes.

Figure 2:
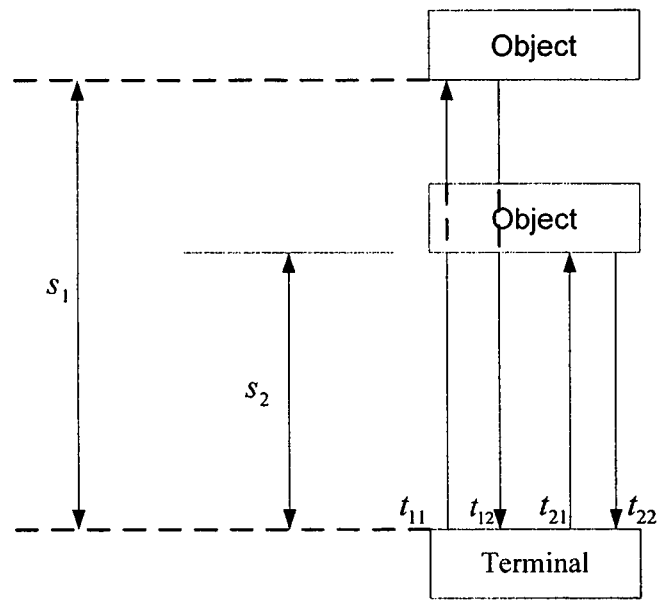
FIG. 2 is a schematic view of a second embodiment of a hard disk protection method according to another embodiment.

Referring to FIG. 2, it is a schematic view of the second embodiment. In FIG. 2, $s_1$ is a distance between the object and the terminal calculated based on the transmission and reception of the ultrasonic waves for the first time; and $s_2$ is a distance between the object and the terminal calculated based on the transmission and reception of the ultrasonic waves for the second time. The calculation of $s_1$ and $s_2$ in detail are the same as in the first embodiment.

Therefore, during the time interval between the two transmitted ultrasonic waves, the moving distance of the object is $\Delta s = s_1 - s_2$.

$t_{11}$ and $t_{12}$ are two moments for transmitting and receiving the ultrasonic wave for the first time respectively; and $t_{21}$ and $t_{22}$ are two moments for transmitting and receiving the ultrasonic wave for the second time respectively.

Therefore, the time interval for the first time is $\Delta t_1 = t_{11} - t_{12}$ and the time interval for the second time is $\Delta t_2 = t_{21} - t_{22}$, then the difference between the two time intervals is $\Delta t = \Delta t_1 - \Delta t_2$.

According to the distance intervals and the time intervals for the two times, the speed v of the object may be calculated as follows: $v = \Delta s / \Delta t$. To this end, it may be determined whether the speed of the object is in the allowed range, so as to determine whether the hanging up operation may be performed to the hard disk or not.

The method of calculating the speed of the object in this embodiment is relatively simple and is easy to be implemented. While in the first embodiment, the method of calculating the speed of the object with the Doppler formula is relatively complex, but is more precise. Therefore, a flexible choice may be made according to the actual requirement.

Hereinafter, a third embodiment of a hard disk protection method is explained.

The above two embodiments are out of the same inventive concept. That is to say, firstly it is determined whether the object is within the distance threshold. Then, it is further determined whether the speed of the object reaches the speed threshold or not, and whether the hanging up operation may be performed to the hard disk or not.

Other than the above concept, it is determined whether the speed of the object exceeds the speed threshold or not in this embodiment. If yes, it is further determined whether the object is within the distance threshold or not. If yes, the hanging up operation is performed to the hard disk.

Or, the speed of the object and the distance of the object may be simultaneously considered, i.e. scale factors may be allocated to the speed and the distance of the object respectively. For example, such a case may be exist that although the speed and the distance of the object do not reach the thresholds, the hanging up operation should still occur when both of them are taken into consideration.

In summary, the embodiments disclosed do not limit the sequence of the determinations on the distance and the speed of the object. Other approaches may implement certain embodiments. The various implementations as discussed above may be summarized as to determine whether the distance and the speed reach the thresholds predetermined by the system or not. If yes, the hard disk is hung up.

Based on the embodiments of the hard disk protection method, such schemes may be further improved. For example, an ultrasonic transceiver may be used to monitor a quality and a shape of the object which is moving to the hard disk. Additionally, it should be noted that the ultrasonic transceiver of the terminal may be one or more, preferably more which could provide a multi-bearing protection to the hard disk.

A second application is explained as follows.

Such an approach which is similar with the above hard disk protection method may be utilized for controlling the keyboard or the mouse. Particularly, the sensing device such as a radio transceiver or an Infrared sensor may be installed on a peripheral device such as the keyboard or the mouse etc. When an object is sensed by the peripheral device within a certain distance (e.g. a hand of a user is sensed), the peripheral device is power-supplied; otherwise, the peripheral device is not power-supplied, in order to save the power. For example, when files are continuously downloaded via the network, the user does not need to use the mouse or the keyboard for a long time. In such a case, if the mouse or the keyboard is maintained by the power-supply, it causes a waste of power. The above method according to some embodiments may solve the problem effectively.

A third application is explained as follows.

Such an approach which is similar with the above hard disk protection method may be utilized for powering up or down the terminal. After the sensing device such as the ultrasonic transceiver or the Infrared sensor is installed in the terminal, the following acts may be performed:

(1) detecting the distance between the terminal and the hand of the user; and (2) if the distance between the terminal and the hand is equal to or less than the threshold, the following acts may be performed:

(3) determining a movement track of the hand and performing corresponding operations. For example, when a gesture of "crossing" is identified, the terminal which is in a running state may perform a power-up operation. And when a gesture which is similar to a "circling" is identified, the terminal which is in a power-down state may perform a power-up operation. Corresponding relationships between various movement tracks of the hand and the operations are predetermined.

The method of automatic power-up or power-down as discussed above is not only convenient, but also improves the security in a certain sense. For example, the user may design and update the power-up gestures by himself, which may prevent others from using his terminal.

The method of implementing an automatic control based on the movement track of the hand as discussed above may also be applied to other parts of the terminal. For example, the forward or backward of the browser, and the automatic page-flipping of the application software such as PPT, etc. Therefore, when it is used by the user, the control of the browser and the application software may be implemented out of a certain distance, which greatly facilitates the operations of the user in some occasions such as when giving a lecture.

Figure 3:
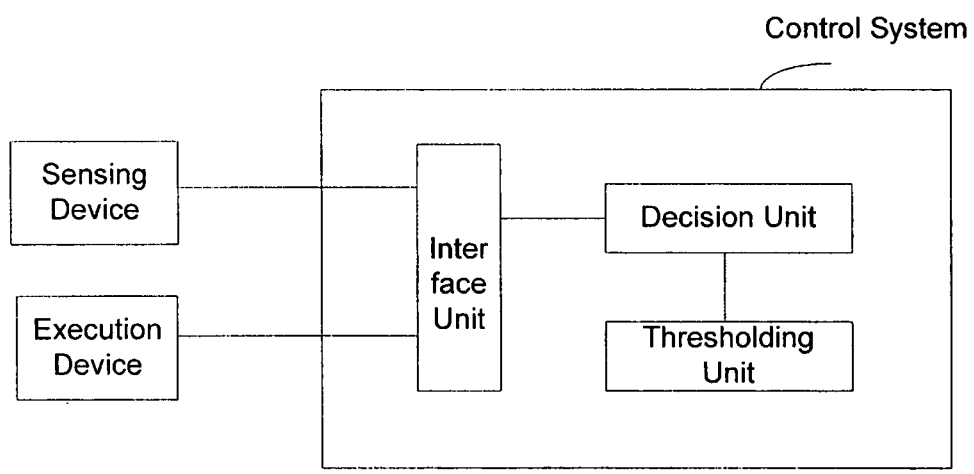
FIG. 3 is a schematic view of a control system according to a certain embodiment.

One embodiment also provides a control system for the terminal which is corresponding to the above method. Referring to FIG. 3, the terminal to which the system belongs may comprise an execution device for turning on or off a part of the terminal and a sensing device. The system may comprise: an interface unit for receiving parameters detected by the sensing device and for sending a command to the execution device; a distance calculation unit for calculating a distance between an object detected by the sensing device and the terminal, according to the parameters provided by the interface unit; a threshold unit for storing a distance threshold; and a decision unit for deciding whether the distance is less than or equal to the distance threshold, in order to send out an execution command.

Similar with the above method, the control system also has various applications, such as the control of the hard disk protection, the power-supplying of the keyboard or the mouse, and the automatic power-up or power-down of the terminal. Explanations will be made respectively below.

Firstly, the control system for a hardware protection provided by one embodiment is discussed as follows.

As discussed previously, the current APS system may comprise two parts: one part is an apparatus for monitoring at a front end, such as an acceleration sensor; the other part is vibration prediction management software installed in a main board, which is for analyzing and deciding based on the monitored results from the front end, in order to determine whether the hard disk is required to be hung up. Similar with the vibration prediction management software in the current APS system, the control system provided by certain embodiments is mainly for analyzing and deciding based on the monitored results from the front end ultrasonic transceiver, in order to control the hanging up of the hard disk. The particular implementation of the control system is not limited by the specific embodiments disclosed, which may be implemented in software and also in hardware.

Referring to FIG. 3, in which the part may be a hard disk, the execution device may be a hard disk control device, and the sensing device is an ultrasonic transceiver.

Figure 4:
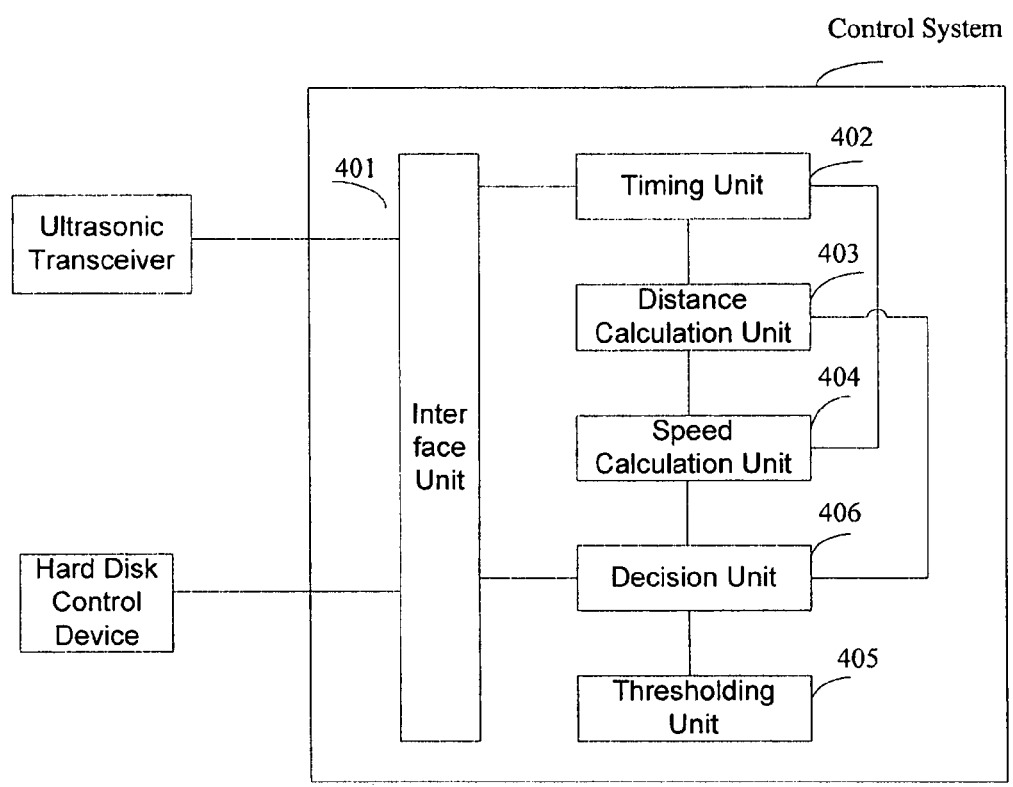
FIG. 4 is a first schematic view of a control system for a hard disk protection according to one embodiment.

Referring to FIG. 4, which is a schematic view of the control system for the hardware protection according to another embodiment. For clarity, the ultrasonic transceiver, and the hard disk control device for hanging-up or cancellation of the hanging-up of the hard disk according to the command of the control system are comprised in FIG. 4. As shown in FIG. 4, the system comprises the interface unit 401, the timing unit 402, the distance calculation unit 403, the speed calculation unit 404, the threshold unit 405, and the decision unit 406. Functions of the respective units may be described as follows.

The interface unit 401 is for controlling communications between the system and the outside, comprising: receiving some parameters of the ultrasonic transceiver (which mainly refer to timing points for the transmitted and the received ultrasonic waves each time) and sending the hanging-up command to the hard disk control device, etc.

The timing unit 402 is used for obtaining the parameters from the interface unit 401, and for calculating and storing time intervals for the transmitted and the received ultrasonic waves each time.

The distance calculation unit 403 calculates the distance between the object and the terminal with the wave speed and the time intervals provided by the timing unit.

The speed calculation unit 404 is for calculating the speed of the object.

The threshold unit 405 is used for storing the distance threshold and the speed threshold.

The decision unit 406 may be a core unit of the control system, which is used for deciding whether the object has already within a certain range of the terminal and whether the speed of the object within the certain range reaches a certain value. Particularly, the decision unit 406 determines whether the distance between the object and the terminal is less than or equal to the distance threshold or not, and whether the speed of the object is larger than or equal to the speed threshold or not, in order to send out the hanging-up command. In practice, the distance may be firstly determined, and then the speed is determined. Also, the speed may be firstly determined, and then the distance is determined. Or both of them are considered simultaneously. As seen from the above embodiments of the method in detail, the corresponding description is omitted herein. The hanging-up command sent out by the decision unit 406 is transmitted to the hard disk control device of the terminal via the interface unit 401.

The speed calculation unit 404 may calculate the speed of the object in various ways. One way as illustrated in FIG. 4 is that the speed calculation unit 404 obtains, from the timing unit 402, the difference of the time intervals between the processes for transmitting and receiving the ultrasonic waves for two times, and obtains, from the distance calculation unit 403, the difference of the distances between the two processes. The speed of the object may be calculated according to the difference of the time intervals and the difference of the distances.

Furthermore, the decision unit 406 is further used for deciding whether the speed of the object is less than the speed threshold or not. If yes, a hanging-up cancellation command is sent out. The interface unit 501 is further used for sending the hanging-up cancellation command to the hard disk control device.

Figure 5:
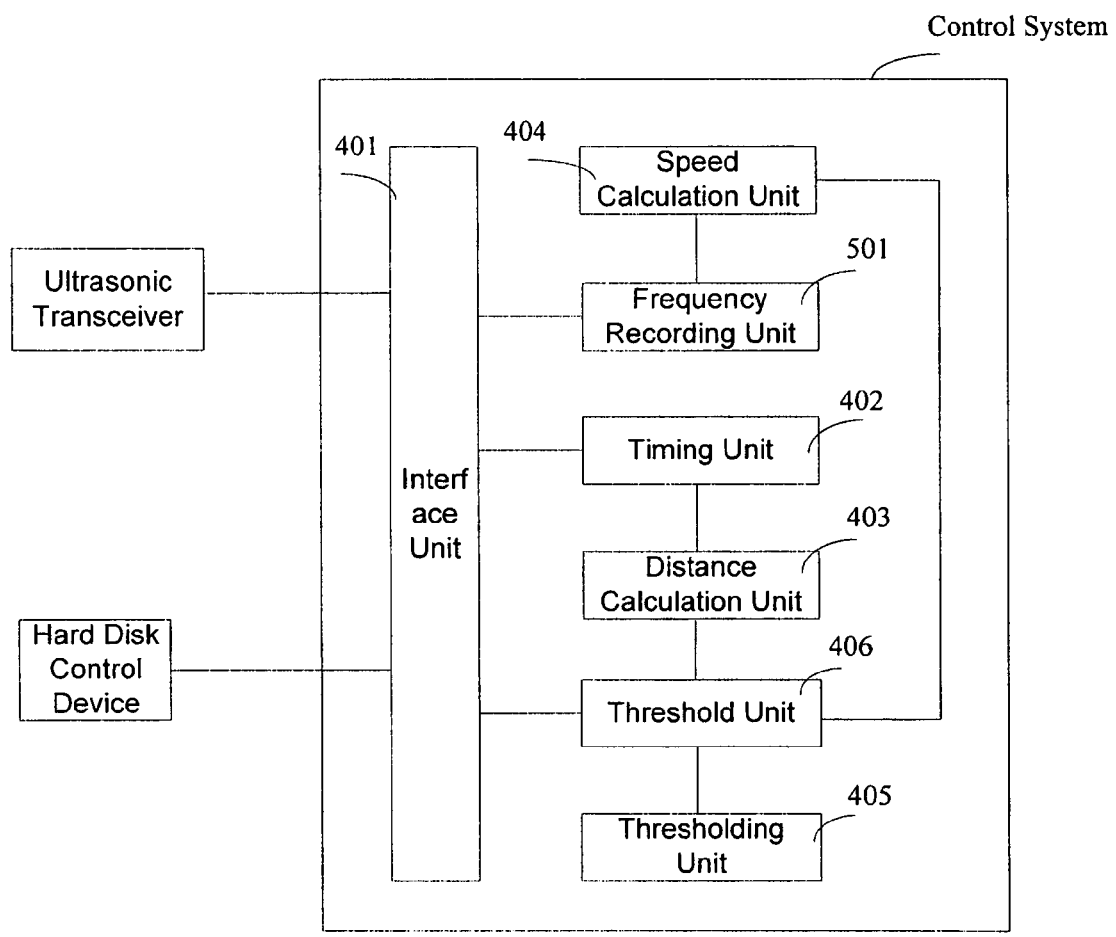
FIG. 5 is a second schematic view of a control system for a hard disk protection according to an embodiment.
Figure 6:
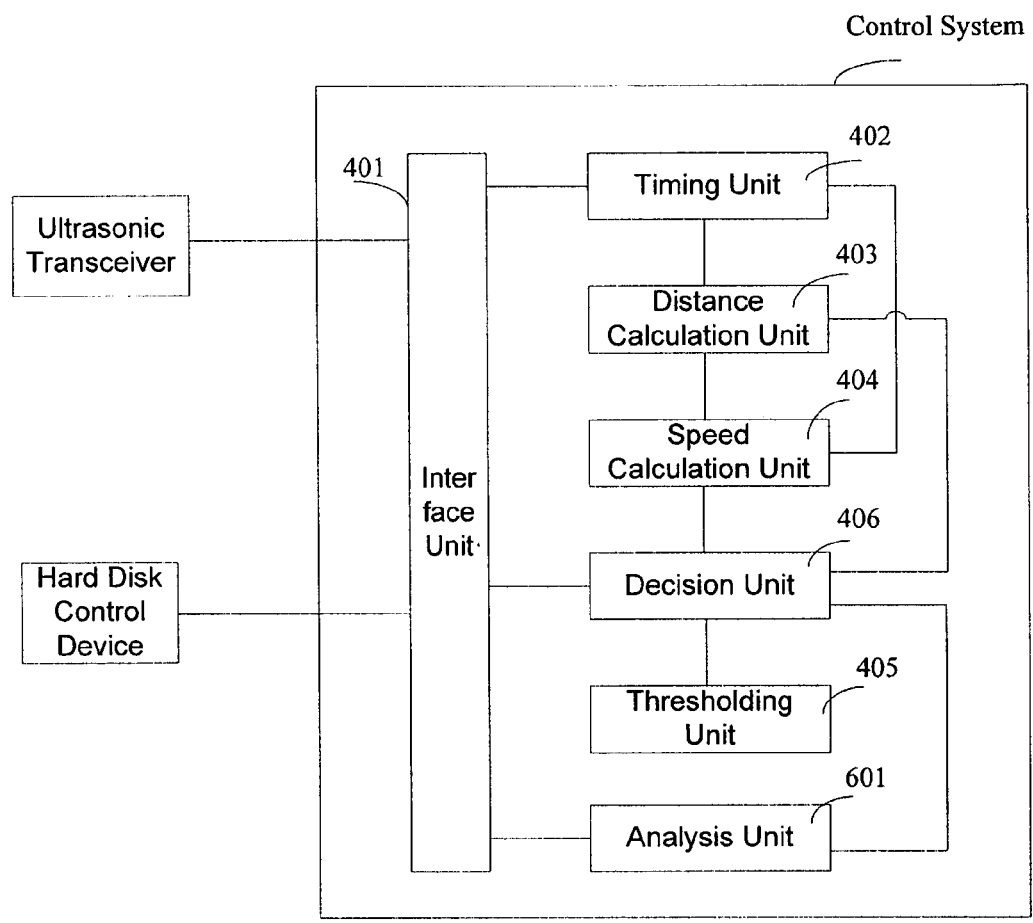
FIG. 6 is a third schematic view of a control system for a hard disk protection according to another embodiment.

Additionally, when it is decided whether the hanging-up command is needed to be sent out, the quality and the shape of the moving object may be synthetically considered. Referring to FIG. 6, the control system based on FIG. 4 further comprises an analysis unit 601. At this point, the interface unit 401 is further used for receiving information on the quality and/or shape of the object identified by the ultrasonic wave. The analysis unit 601 is used for making a quantization analysis to the information provided by the interface unit 401. The decision unit 406 sends out the hanging-up command based on the decision on the speed of the object in connection with the analysis result from the analysis unit 601. Moreover, the analysis unit 601 may be added to FIG. 5, whose description is omitted herein.

Next, the power saving system for the peripheral device of the terminal is described below.

Referring to FIG. 3, the part may be a mouse or a keyboard. The execution apparatus may be a power-supply control unit of the mouse or the keyboard. The sensing unit is the ultrasonic transceiver or the infrared sensor. The decision unit sends out a power-supply command to the power-supply control unit of the mouse or the keyboard, when it determines that a distance between a hand of a user which is detected by the ultrasonic transceiver or the infrared sensor and the mouse or the keyboard is less than or equal to the distance threshold; otherwise, the power-supply control unit of the mouse or the keyboard sends out a power-supply forbidden command.

Finally, the control system for powering up or down the terminal is described below.

Referring to FIG. 3, the part may be a power switch of the terminal. The sensing unit is an ultrasonic transceiver or an infrared sensor. The decision unit further determines a movement track of a hand of a user when it determines that a distance between the hand which is detected by the ultrasonic transceiver or the infrared sensor and the mouse or the keyboard is less than or equal to the distance threshold; and sends the power-up or power-down command corresponding to the movement track of the hand to the execution apparatus.

Additionally, one embodiment also discloses a terminal comprising the above system. Referring to FIG. 4, in which a sensor device is newly added and a larger improvement is made to the control system. The description of the related structure and function of the control system are omitted herein.

Only certain embodiments are disclosed above and the present invention is not limited to the above embodiments. Therefore, any modifications, substitutions and improvements to the present invention are possible without departing from the spirit and scope of the present invention.

What is claimed is:

1. A control system for a terminal comprising an execution device for a particular part of the terminal, wherein the terminal further comprises a sensing device, and the system comprises:
   an interface unit configured to receive parameters detected by the sensing device and for sending a command to the execution device;
   a distance calculation unit configured to calculate a distance between an object detected by the sensing device and the terminal, according to the parameters provided by the interface unit;
   a threshold unit configured to store a distance threshold; and
   a decision unit configured to determine whether the distance is less than or equal to the distance threshold, in order to send out an execution command,
   wherein said execution device automatically controls operations of a part of the terminal in accordance with the execution command.

2. The system according to claim 1, wherein the part comprises a hard disk and the execution device comprises a hard disk control device, and wherein the sensing device comprises an ultrasonic transceiver; the system further comprising:
   a timing unit configured to obtain parameters from the interface unit, and configured to calculate a time interval between the times for receiving and transmitting ultrasonic waves;
   a distance calculation unit configured to calculate a distance between the object and the terminal by using a wave speed and the time interval provided by the timing unit;
   a speed calculation unit configured to calculate a speed of the object;
   the interface unit configured to receive parameters for the ultrasonic waves transmitted or received by the ultrasonic transceiver, and configured to send a hanging-up command to the hard disk control device;
   the threshold unit configured to store the distance threshold and a speed threshold; and
   the decision unit configured to determine whether the distance is less than or equal to the distance threshold or not and configured to determine the speed of the object is larger than or equal to the speed threshold, in order to send out the hanging-up command.

3. The system according to claim 2, further comprises:
   a frequency recording unit configured to obtain a first frequency for the transmitted ultrasonic wave from the interface unit and a second frequency for the reflected ultrasonic wave;
   wherein the speed calculation unit is configured to calculate the speed based on, at least in part, the first frequency and the second frequency which satisfy a Doppler relationship.

4. The system according to claim 2, wherein the speed calculation unit is configured to obtain, from the timing unit, a difference of the time intervals between transmission of the ultrasonic wave and reception of the reflected ultrasonic wave twice; and is configured to obtain, from the distance calculation unit, the distances between the twice of the processes; and calculates the speed of the object according to the difference of the distances and the difference of the time intervals.

5. The system according to claim 2, wherein
   the decision unit is further configured to determine whether the speed is less than the speed threshold or not, and if yes, configured to send a hanging-up cancellation command, and
   wherein the interface unit is further configured to send the hanging-up cancellation command to the hard disk control device.

6. The system according to claim 5, wherein
   the interface unit is configured to receive information on a quality and/or shape of an object identified by the ultrasonic wave;
   the control unit further comprises an analysis unit configured to analyze parameters of the quality and/or shape of the object;
   the decision unit is further configured to send out a hanging-up command based on, at least in part, the decision on the speed of the object as well as the analysis result of the quality and/or shape of the object.

7. The system according to claim 1, wherein
the part comprises a mouse or a keyboard, the execution apparatus comprises a power-supply control unit of the mouse or the keyboard, and the sensing unit comprises an ultrasonic transceiver or an infrared sensor;
the decision unit is configured to send a power-supply command to the power-supply control unit of the mouse or the keyboard, when it determines that a distance between a hand of a user which is detected by the ultrasonic transceiver or the infrared sensor and the mouse or the keyboard is less than or equal to the distance threshold; otherwise, the power-supply control unit of the mouse or the keyboard sends out a power-supply forbidden command.

8. The system according to claim 1, wherein
the part comprises a power switch of the terminal, a browser, and application software, and the sensing unit comprises an ultrasonic transceiver or an infrared sensor;
the decision unit is further configured to determine a movement track of a hand of a user when it determines that a distance between the hand which is detected by the ultrasonic transceiver or the infrared sensor and the mouse or the keyboard is less than or equal to the distance threshold; and is configured to send an execution command based on, at least in part, the movement track of the hand to the execution apparatus.

9. A terminal comprising an execution apparatus for a particular part of the terminal, wherein the terminal further comprises a sensing device and a control system, and the system comprises:
an interface unit configured to receive parameters detected by the sensing device and for sending a command to the execution device;
a distance calculation unit configured to calculate a distance between an object detected by the sensing device and the terminal, according to the parameters provided by the interface unit;
a threshold unit configured to store a distance threshold; and
a decision unit configured to determine whether the distance is less than or equal to the distance threshold, in order to send out an execution command,
wherein said execution device automatically controls operations of a part of the terminal in accordance with the execution command.

10. The terminal according to claim 9, wherein the part comprises a hard disk, the execution apparatus comprises a hard disk control device, and the sensing device comprises an ultrasonic transceiver; the system further comprises:
a timing unit configured to obtain parameters from the interface unit, and configured to calculate a time interval between the times for receiving and transmitting ultrasonic waves for each time;
a distance calculation unit configured to calculate a distance between the object and the terminal by using a wave speed and the time interval provided by the timing unit;
a speed calculation unit configured to calculate a speed of the object;
the interface unit further configured to receive parameters for the ultrasonic waves transmitted or received by the ultrasonic transceiver, and for sending a hanging-up command to the hard disk control device;
the threshold unit configured to store the distance threshold and a speed threshold; and
the decision unit configured to determine whether the distance is less than or equal to the distance threshold and deciding the speed of the object is larger than or equal to the speed threshold, in order to send out the hanging-up command.

11. The terminal according to claim 9, wherein
the part comprises a mouse or a keyboard, and the sensing unit comprises an ultrasonic transceiver or an infrared sensor;
the decision unit is configured to send a power-supply command to the power-supply control unit of the mouse or the keyboard, when it determines that a distance between a hand of a user which is detected by the ultrasonic transceiver or the infrared sensor and the mouse or the keyboard is less than or equal to the distance threshold; otherwise, the power-supply control unit of the mouse or the keyboard is configured to send a power-supply forbidden command.

12. The terminal according to claim 9, wherein
the part comprises a power switch of the terminal, a browser, and application software, and the sensing unit comprises an ultrasonic transceiver or an infrared sensor;
the decision unit is further configured to determine a movement track of a hand of a user when it determines that a distance between the hand which is detected by the ultrasonic transceiver or the infrared sensor and the mouse or the keyboard is less than or equal to the distance threshold; and configured to send an execution command corresponding to the movement track of the hand to the execution apparatus.

* * * * *